(12) United States Patent
Lee et al.

(10) Patent No.: US 9,281,958 B2
(45) Date of Patent: Mar. 8, 2016

(54) METHOD FOR PROVIDING INTERWORKING SERVICE IN HOME NETWORK

(71) Applicant: Electronics and Telecommunications Research Institute, Daejeon (KR)

(72) Inventors: Hark Jin Lee, Daejeon (KR); Eun Seo Lee, Daejeon (KR); Kwangil Lee, Daejeon (KR); Jun Hee Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 248 days.

(21) Appl. No.: 13/934,064

(22) Filed: Jul. 2, 2013

(65) Prior Publication Data

US 2014/0304385 A1 Oct. 9, 2014

(30) Foreign Application Priority Data

Apr. 5, 2013 (KR) ........................ 10-2013-0037619

(51) Int. Cl.
*G06F 15/173* (2006.01)
*H04L 12/28* (2006.01)

(52) U.S. Cl.
CPC .......... *H04L 12/2805* (2013.01); *H04L 12/283* (2013.01); *H04L 12/2834* (2013.01); *H04L 2012/2841* (2013.01)

(58) Field of Classification Search
CPC ..... H04L 67/2819; G06F 3/0482; H04W 8/18
USPC ....................................................... 709/223
See application file for complete search history.

(56) References Cited

U.S. PATENT DOCUMENTS

| | | | |
|---|---|---|---|
| 2003/0046580 A1* | 3/2003 | Taniguchi et al. | 713/200 |
| 2007/0180136 A1* | 8/2007 | Li et al. | 709/231 |
| 2008/0112419 A1 | 5/2008 | Lee et al. | |
| 2009/0132698 A1 | 5/2009 | Barnhill, Jr. | |
| 2010/0071053 A1* | 3/2010 | Ansari et al. | 726/12 |

FOREIGN PATENT DOCUMENTS

| KR | 10-2004-0073099 A | 8/2004 |
|---|---|---|
| KR | 10-2006-0069170 A | 6/2006 |

* cited by examiner

*Primary Examiner* — Wing F Chan
*Assistant Examiner* — Andrew Woo

(57) ABSTRACT

A method provides an interworking service in a home network. In view of the above, the present invention provides a method for providing an interworking service in a home network, in which servers and adaptors existing in a home network can identify with each other and servers or adaptors are not doubly connected to a device.

7 Claims, 10 Drawing Sheets

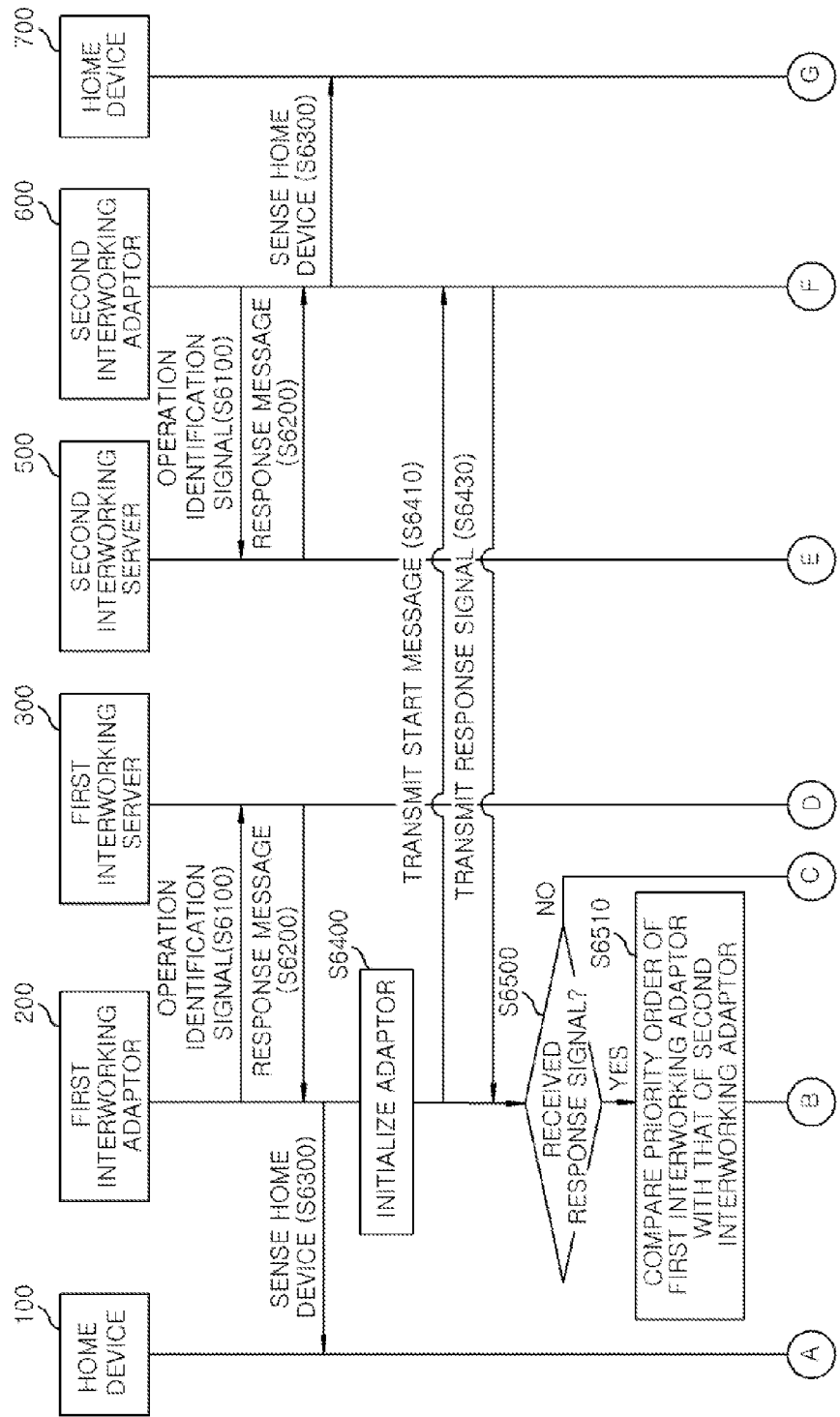

METHOD FOR PROVIDING INTERWORKING SERVICE IN HOME NETWORK

RELATED APPLICATIONS

This application claims the benefit of Korean Patent Application No. 10-2013-0037619, filed on Apr. 5, 2013, which is hereby incorporated by reference as if fully set forth herein.

FIELD OF THE INVENTION

The present invention relates to a method for providing interworking service in a home network, and more particularly, to a method for providing an interworking service in a home network that a server and an adaptor in a home network can identify with each other.

BACKGROUND OF THE INVENTION

With the increased spread of home network services, recently, the trend is that a server or an adaptor is under the development, which supports interworking between devices using different middleware that exist on a home network. Accordingly, the devices using different middleware became compatible with one another.

Meanwhile, a method for providing an interworking service in a home network is embodied by interworking all devices that have access to heterogeneous home network middleware. In regard to the method for providing an interworking service, Korean Laid-Open Patent Application No. 2006-0069170, laid-opened on Jun. 21, 2006, discloses a method in which all devices having access to heterogeneous home network middleware are visualized as real physical devices having access to virtually same middleware.

However, when providing an interworking service, in case that plural servers and adaptors are included, the plural servers and adaptors identify with one another so that the servers or adaptors may be commonly connected to a middleware device. Further, when an update occurs in case that the servers and adaptors are plural, each server or adaptor should be manually set up to update.

SUMMARY OF THE INVENTION

In view of the above, the present invention provides a method for providing an interworking service in a home network, in which servers and adaptors existing in a home network can identify with each other and servers or adaptors are not doubly connected to a device. However, the object of an exemplary embodiment of the present invention is not limited thereto as described above, and it is understood that there may be other objects.

In accordance with an aspect of the exemplary embodiment of the present invention, there is provided a method for providing an interworking service in a home network implemented by an interworking server, which includes: sensing, in one or more interworking servers that are same in type, one or more home devices that are connected to the one or more interworking servers, respectively; transmitting, in a first interworking server of the one or more interworking servers, a start message based on an initialization to the remaining interworking servers, so that the one or more interworking servers are not doubly connected to the sensed one or more home devices; when the first interworking server receives a response to the start message from a second interworking server, determining, in the first interworking server, a competitive advantage on the basis of a priority order between the first and second interworking servers; and when the first interworking server has a priority order higher than that of the second interworking server, starting, in the first interworking server, to drive so as to make a connection to the one or more home devices.

In accordance with any one of the above described embodiments of the present invention, servers or adaptors existing in a home network can identify with each other, and servers or adaptors cannot be doubly connected to a device. Further, since the version is managed through the mutual recognition update, it may be possible to minimize a user intervention.

BRIEF DESCRIPTION OF THE DRAWINGS

The above and other objects and features of the present invention will become apparent from the following description of the embodiments given in conjunction with the accompanying drawings, in which:

FIGS. 6A and 6B is a sequential diagram illustrating a process for transceiving data among respective components included in the system for providing interworking service in a home network shown in FIG. 1 in accordance with another embodiment of the present invention;

DETAILED DESCRIPTION OF THE EMBODIMENTS

Figure 1:
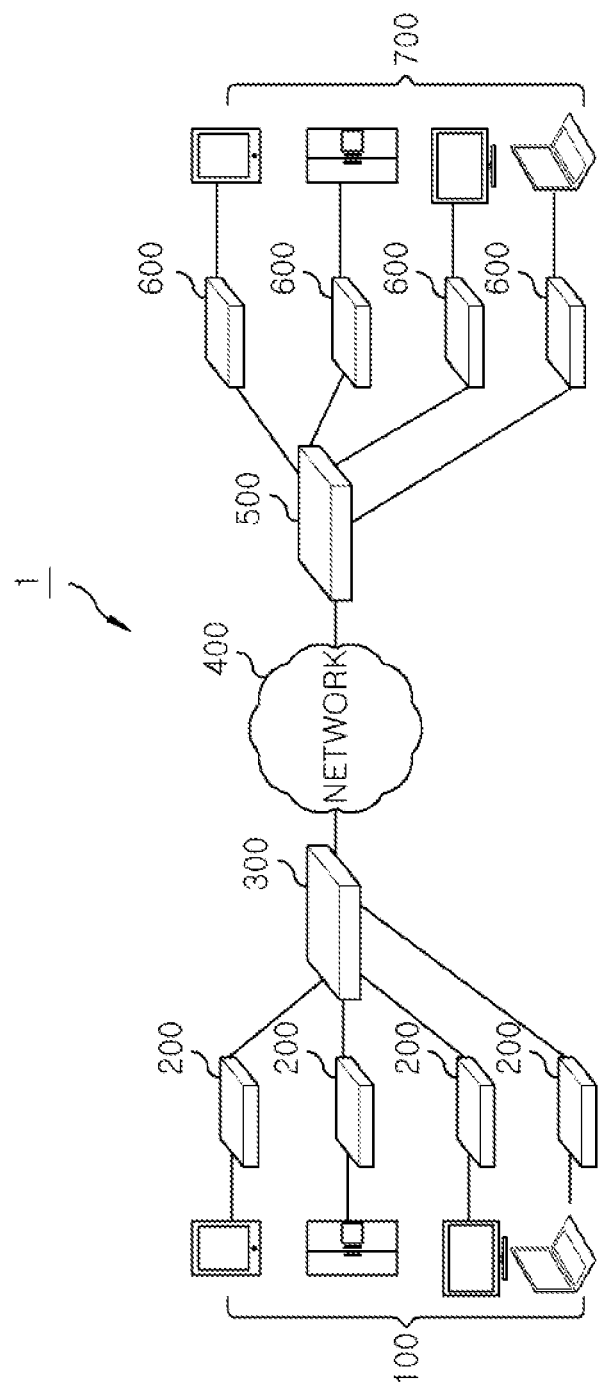
FIG. 1 is a configuration diagram illustrating a system for providing interworking service in a home network in accordance with an embodiment of the present invention.

Hereinafter, embodiments of the present invention will be described in detail with reference to the accompanying drawings so that they can be readily implemented by those skilled in the art. However, the present invention may be embodied in different forms, but it is not limited thereto. In the drawings, further, portions unrelated to the description of the present invention will be omitted for clarity of the description and like reference numerals and like components refer to like elements throughout the detailed description.

In the entire specification, when a portion is "connected" to another portion, it means that the portions are not only "connected directly" with each other but they are electrically connected" with each other by way of another device therebetween. Further, when a portion "comprises" a component, it means that the portion does not exclude another component but further comprises other component unless otherwise described. Furthermore, it should be understood that one or more other features or numerals, steps, operations, components, parts or their combinations can be or are not excluded beforehand.

Hereinafter, the embodiments of the present invention will be described in detail with reference to the accompanying drawings.

FIG. 1 is a configuration diagram illustrating a system for providing interworking service in a home network in accordance with an embodiment of the present invention. Referring to FIG. 1, a system 1 for providing interworking service in a home network may comprise a plurality of home devices 100, a plurality of first interworking adaptor 200, a first interworking server 300, a second interworking server 500, a plurality of second interworking adaptors 600, and a plurality of home devices 700. However, since the system 1 for providing interworking service in a home network shown in FIG. 1 is merely an embodiment of the present invention, it should be understood that the embodiment of the present invention is not limited to the system shown in FIG. 1.

In this case, respective components shown in FIG. 1 are generally connected with one another through a network 400. For example, as shown in FIG. 1, the first and second interworking servers 300 and 500 may be connected with each other through the network 400, the first interworking server 300 may be connected to the first interworking adaptor 200, and the first interworking adaptor 200 may be connected to the home device 100. Further, the second interworking server 500 may be connected to the second interworking adaptor 600 and the second interworking adaptor 600 may be connected to the home device 700. Further, the first and second interworking adaptors 200 and 600 may be connected with each other through the network 400, and the home devices 100 and 700 may be connected with each other through the network 400. In this case, the first interworking adaptor 200 may be constituted together with the first interworking server 300, and the second interworking adaptor 600 may be constituted together with the second interworking server 500.

Herein, the network 400 means a connection structure through which nodes such as terminals or servers can communicate information therebetween and may include the Internet, LAN (Local Area Network), Wireless LAN (Wireless Local Area Network), WAN (Wide Area Network), PAN (Personal Area Network), 3G, 4G, LTE (Long Term Evolution), Wi-Fi, ZigBee, for example, but not be limited thereto. Further, it is noted that the home device 100, the first interworking adaptor 200, the first interworking server 300, the second interworking server 500, the second interworking adaptor 600 and the home device 700 of the embodiment are not construed as being limited to those shown in FIG. 1.

The home devices 100 and 700 may be devices connected to the first and second interworking adaptors 200 and 600, respectively. For example, each of the home devices 100 and 700 may be kinds of home appliances such as a Wall Pad, a Smart TV and a Smart Pad, or communication devices, and each of the first the second interworking adaptor 200 and 600 may include an UPnP device, an RS485 device or a ZigBee protocol device. Further, each of the home devices 100 and 700 may be a Home Gateway, a Wall Pad, a Remote Controller, an in-house network equipment and a telemetering system, and include a computer system that may have access to a server or a terminal through the network 400. Here, the computer system may include a notebook computer, a desktop computer, and a laptop computer, in which a Web browser is mounted, for example. Further, the home devices 100 and 700 are wireless communication devices that guarantee portability and mobility, for example, including all kinds of handheld-based wireless communication devices such as PCS (Personal Communication System), GSM (Global System for Mobile communications), PDC (Personal Digital Cellular), PHS (Personal Handyphone System), PDA (Personal Digital Assistant), IMT (International Mobile Telecommunication)-2000, CDMA (Code Division Multiple Access)-2000, W-CDMA (W-Code Division Multiple Access), WiBro (Wireless Broadband Internet) terminal, Smart Phone, Smart Pad, and Tablet PC.

The first and second interworking adaptors 200 and 600 may exist for each middleware. For example, the middleware may be HAVI (Home Audio Interoperability), JINI, LonWorks, HnCP (Home Network Control Protocol), and UPnP (Universal Plug and Play), and the interworking adaptors 200 and 600 may be separately every middleware. Further, the first and second interworking adaptors 200 and 600 may be connected correspondingly to local middleware devices existing on different middleware, and may manage information on the first and second interworking servers 300 and 500, respectively, so as to make a connection to the first and second interworking servers 300 and 500, respectively.

The first and second interworking servers 300 and 500 may be constituted to support an interaction between local middleware devices. Further, the first and second interworking servers 300 and 500 may each include an IWF (Inter Working Function) engine, and a standard protocol channel may be formed between IWF engines so that an interworking function can be implemented. For example, in the case of a home gateway that employs RS-485 and a wall pad that employs ZigBee, they may not be interworked due to using different protocols, however, they may be interworked when using an IWF engine.

Further, the first and second interworking servers 300 and 500 may collect message grammar conversion rules for interaction to the first and second interworking adaptors 200 and 600 and register the message grammar conversion rules in each message format. Further, the IWF engine may interconvert messages from local middleware devices in line with the message grammar conversion rules, and transfer the message whose grammar has been converted in each message format. Accordingly, the first and second interworking servers 300 and 500 enables all devices connected on different middleware to operate as real physical devices that are virtually connected on the same middleware.

The method for providing interworking service in a home network in accordance with an embodiment of the present invention will be described by way of an example.

It is assumed that all power sources turn on after a power outage, a user turns on all power sources when coming back home or lighting power sources are simultaneously turned on after being turned off. In this case, assuming that there is a home appliance that uses a ZigBee protocol, and the first and second interworking adaptors 200 and 600 are adaptors that are connected to the ZigBee protocol, the first and second interworking adaptors 200 and 600 may each try to connect to the home appliance that uses the ZigBee protocol in the state that they do not identify with each other.

Otherwise, when it is assumed that there is a home appliance that uses a ZigBee protocol, and the first and second interworking servers 300 and 500 are servers that can be connected to the ZigBee protocol, the first and second interworking servers 300 and 500 may each try to connect to the home appliance that uses the ZigBee protocol in the state that they do not identify with each other.

Accordingly, the method for providing interworking service in a home network in accordance with an embodiment of the present invention defines message grammar rules to allow the servers or adaptors to identify with one another and transmits and receives messages based on initialization to allow the servers or adaptors to identify with one another, so that the servers or adaptors are not doubly connected to one home device.

Figure 2:
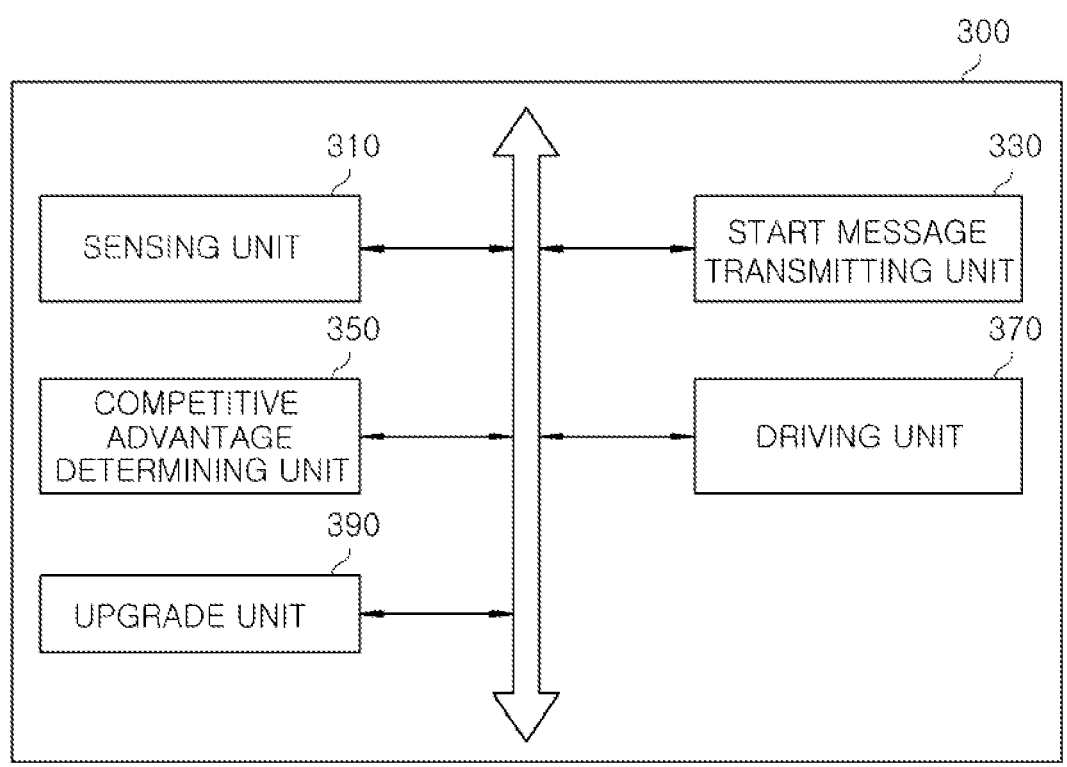
FIG. 2 is a configuration diagram illustrating the first interworking server shown in FIG. 1.
Figure 3:
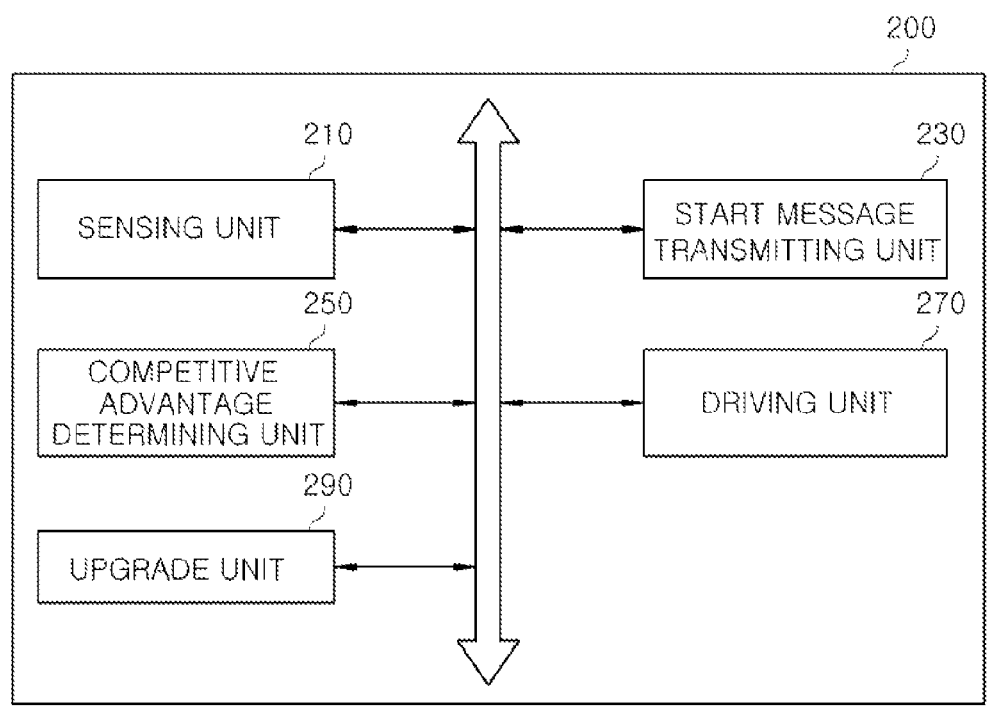
FIG. 3 is a configuration diagram illustrating the first interworking adaptor shown in FIG. 1.
Figure 4A:
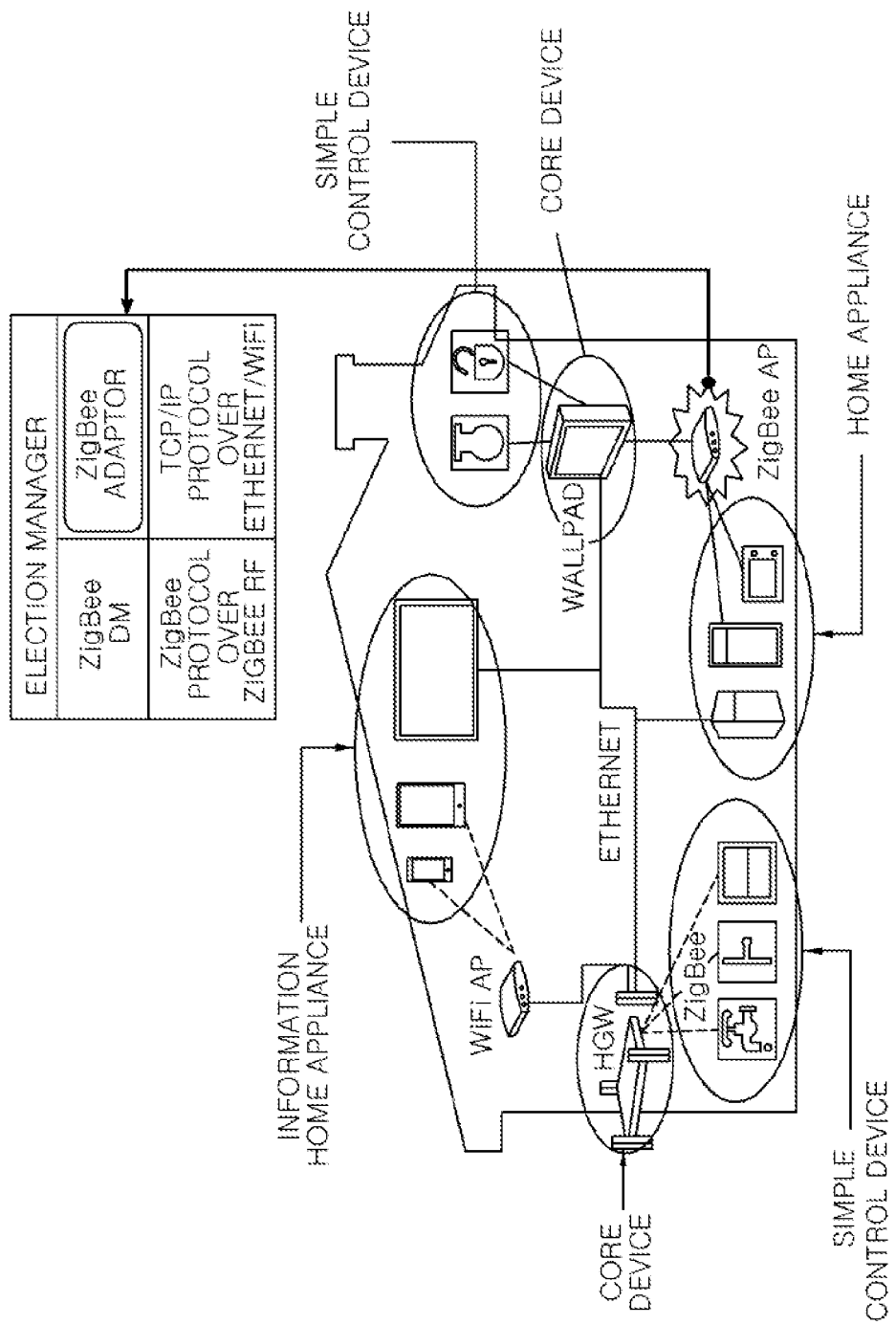
FIGS. 4A and 4B are diagrams illustrating an embodiment of the system for providing interworking service in a home network shown in FIG. 1.
Figure 4B:
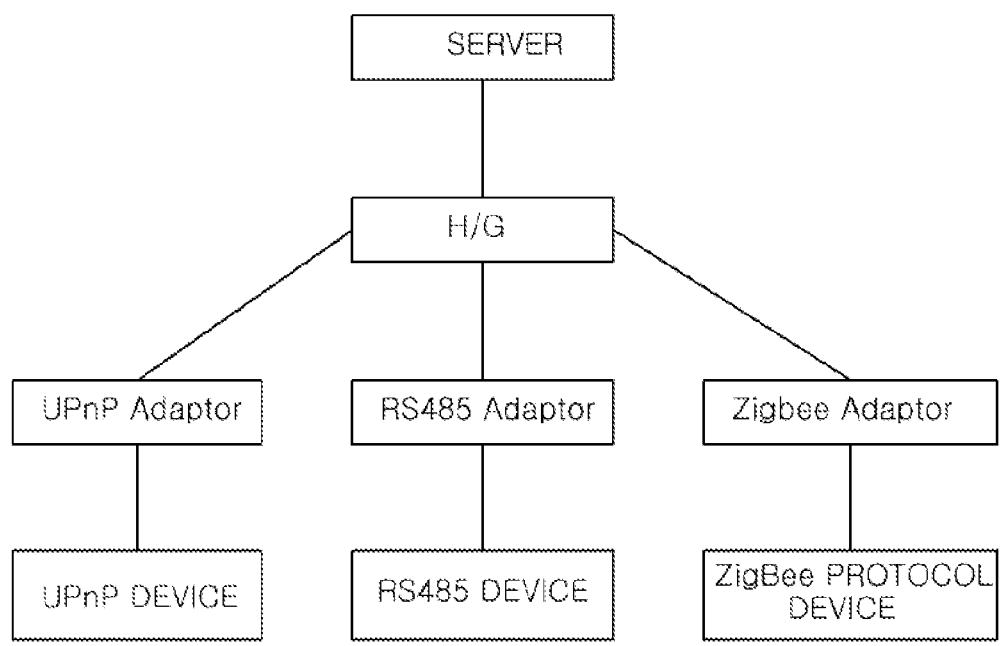

FIG. 2 is a configuration diagram illustrating the first interworking server shown in FIG. 1, FIG. 3 is a configuration diagram illustrating the first interworking adaptor shown in FIG. 1, and FIGS. 4A and 4B are diagrams illustrating an embodiment of the system for providing interworking service in a home network shown in FIG. 1.

Referring to FIG. 2, a first interworking server 300 in accordance with an embodiment of the present invention may include a sensing unit 310, a start message transmitting unit 330, a competitive advantage determining unit 350, a driving unit 370, and an upgrade unit 390. In this regard, though a following description is made with respect to the first interworking server 300, it is also applied to a second interworking server 500 and other interworking servers (not shown) existing in the system 1 for providing interworking service in a home network in accordance with an embodiment of the present invention, and therefore, the description will be omitted.

The sensing unit 310 senses one or more home devices 100 connected to the first interworking server 300. Referring to FIG. 4A, an interworking server includes Wi-Fi AP and ZigBee AP, and there exists an adapter of H/G (Home Gateway). If the Wi-Fi AP is a ZigBee AP in FIG. 4A, there exist two servers having the same type. In this case, since a wall pad using the ZigBee AP is connected to Ethernet, it is noted that the wall pad is doubly connected the two ZigBee APs. Accordingly, in accordance with an embodiment of the present invention, the two servers start to sense in order to prevent a double connection that occurs due to the fact that they do not identify with each other.

Returning again to FIG. 2, one or more interworking servers (not shown) that are the same type as the first interworking sever 300, as well as the first interworking server 300 may sense one or more home devices (not shown) connected to one or more interworking servers, respectively. However, as described above, the operation of the first interworking server 300 is the same as those of the interworking servers except the first interworking server 300 and, therefore, the description thereof will be omitted. Further, the description will be given with reference to the first interworking server 300, and it is assumed that the first and second interworking servers 300 and 500 can be connected to a same type home device and there exist only two home servers in a home network.

In order that one or more interworking severs are not doubly connected to the sensed one or more home devices 100, the start message transmitting unit 330 transmits a start message based on initialization to each of remaining interworking servers. For example, assuming that there are interworking servers A, B, C and D, the interworking servers A, B, C and D may each sense home device connected to the interworking servers A, B, C and D. Further, the interworking server A may transmit the start message to the interworking servers B, C and D, the interworking server B may transmit the start message to the interworking servers A, C and D, the interworking server C may transmit the start message to the interworking servers A, B and D, and the interworking server D may transmit the start message to the interworking servers A, B and C. Further, when the start message transmitting unit 330 does not receive a response to the start message from the one or more interworking servers, the first interworking server 300 may start to drive so as to make a connection to the one or more home devices 100. That is, since the start message transmitting unit 330 identified that there was no other interworking servers connected to the one or more home device 100, the first interworking server 300 is rendered to connect to the one or more home devices 100.

When the first interworking server 300 receives a response to the start message from the second interworking server 500, the competitive advantage determining unit 350 determines a competitive advantage on the basis of a priority order between the first and second interworking servers 300 and 500. For example, the first and second interworking servers 300 and 500 may simultaneously try to connect to a home device which is called 'A' after a power outage. In this case, if the first interworking server 300 identifies the second interworking server 500, then it is possible for both servers 300 and 500 to determine a competitive advantage between them, thereby preventing a double connection. In this regard, the priority order may be settled depending on at least one of a user setting, an IP address and a MAC address. Further, the user's setting may be the highest priority, followed by the IP address, and the MAC address may be the lowest priority, and such order may be variously changed. Further, when the first interworking server 300 has a priority order lower than that of the second interworking server 500, the first interworking server 300 may terminate its operation and be in a standby mode until to receive a start message based on the initialization from the one or more interworking servers. Additionally, the first interworking server 300 may periodically transmit the message to another interworking server.

When the first interworking server 300 has a priority order higher than that of the second interworking server 500, the driving unit 370 starts to drive so as to be connected to one or more home devices 100.

When the first interworking server 300 receives a response to the start message from the second interworking server 500, the upgrade unit 390 may analyze a message included in the received response and identify whether the second interworking server 500 has a program whose version is higher than that of the first interworking server 300. Further, when it is identified that the second interworking server 500 has the program whose version is higher than that of the first interworking server 300, the upgrade unit 390 may start to upgrade so that the first interworking server 300 has a program whose version is the same as that of the second interworking server 500. At this time, the first interworking server 300 may start again after completing the upgrade. Consequently, the upgrade unit 390 may implement a mutual recognition update.

Additionally, one or more interworking servers may be configured to connect to one or more interworking adaptors and one or more interworking adaptors may be configured to connect one or more interworking servers to one or more home devices. Further, one or more interworking adaptors may be configured to be arranged for each middleware mounted in one or more home devices. Referring FIG. 4B, when there is one server, the server may be connected to a plurality of adaptors (UPnP Adaptor, RS485 Adaptor, and ZigBee Adaptor) through an H/G (Home Gateway). Further, each adaptor may exist for each middleware, and the different adaptors may be connected to their corresponding middleware. For example, the UPnP adaptor may be connected to the UPnP device, the RS485 adaptor may be connected to the RS485 device, and the ZigBee adaptor may be connected to a ZigBee protocol device.

The system for providing interworking service in a home network in accordance with an embodiment of the present invention defines message grammar rules to allow the servers or adaptors to identify with one another, and transmits and receives a message based on an initialization to allow servers or adaptors to identify with one another, so that it is prevented for one or more servers or adaptors to be doubly connected to one home device.

Referring to FIG. 3, a first interworking adaptor 200 in accordance with another embodiment of the present invention may include a sensing unit 210, a start message transmitting unit 230, a competitive advantage determining unit 250, a driving unit 270 and an upgrade unit 290.

First, a sensing unit is included in one or more interworking adaptors (not shown), and the sensing unit determines whether one or more interworking servers, which are connected to the one or more interworking adaptors having the same type, are in an operation mode. Further, when it is determined that one or more interworking servers are in an operation mode, the one or more interworking adaptors sense one or more home devices connected to the one or more interworking adaptors. In this regard, the sensing unit is included in the respective interworking adaptors and, therefore, the sensing unit 210 may also perform the same function as described above in the first interworking adaptor 200.

In order that one or more interworking adaptors are not doubly connected to the sensed one or more home devices, the start message transmitting unit 230 enables the first interworking adaptor 200 among the interworking adaptors to transmit a start message based on an initialization to the remaining interworking adaptors. Similarly, the start message transmitting unit 230 is included in the respective interworking adaptors and, therefore, the same function as described above may also be performed in the first interworking adaptor 200.

When the first interworking adaptor 200 received a response to the start message from the second interworking adaptor 600, the competitive advantage determining unit 250 enables the first interworking server 300 to determine a competitive advantage on the basis of a priority order between the first and second interworking server 300 and 500. As a result of the determination, when the first interworking adaptor 200 has a priority order lower than that of the second interworking server 600, the first interworking adaptor 200 is allowed to terminate its operation and be in a standby mode until to receive a start message for initialization from the one or more interworking adaptors. Further, when the first interworking adaptor 200 did not receive a response to the start message from the one or more interworking adaptors, the first interworking adaptor 200 may start to drive so as to be connected to the one or more home devices 700. Here, the priority order may be based on at least one of a user setting, an IP address, and a MAC address.

When the first interworking adaptor 200 has a priority order higher than that of the second interworking adaptor 600, the driving unit 270 may start to drive so as to connect the first interworking adaptor 200 to one or more home devices 700.

When the first interworking adaptor 200 receives a response to the start message from the second interworking adaptor 600, the upgrade unit 290 may analyze data included in the response and identify whether the second interworking adaptor 600 has a program whose version is higher than that of the first interworking adaptor 200. Further, when it is identified that the second interworking adaptor 600 has the program whose version is higher than that of the first interworking adaptor 200, the upgrade unit 290 may enable the first interworking adaptor 200 to upgrade so as to have a program whose version is the same as that of the second interworking adaptor 600.

While the another embodiment of the present invention has been described with respect to the first interworking adaptor, the operation of the first interworking adaptor performs and the constitution therefor are similar to those of the first interworking server. Thus, what was not described for the interworking adaptor of FIG. 3 is identical to or can be inferred from what was described for the first interworking server through FIG. 2 above, and therefore, a further description of the first interworking adaptor will be omitted.

Figure 5:
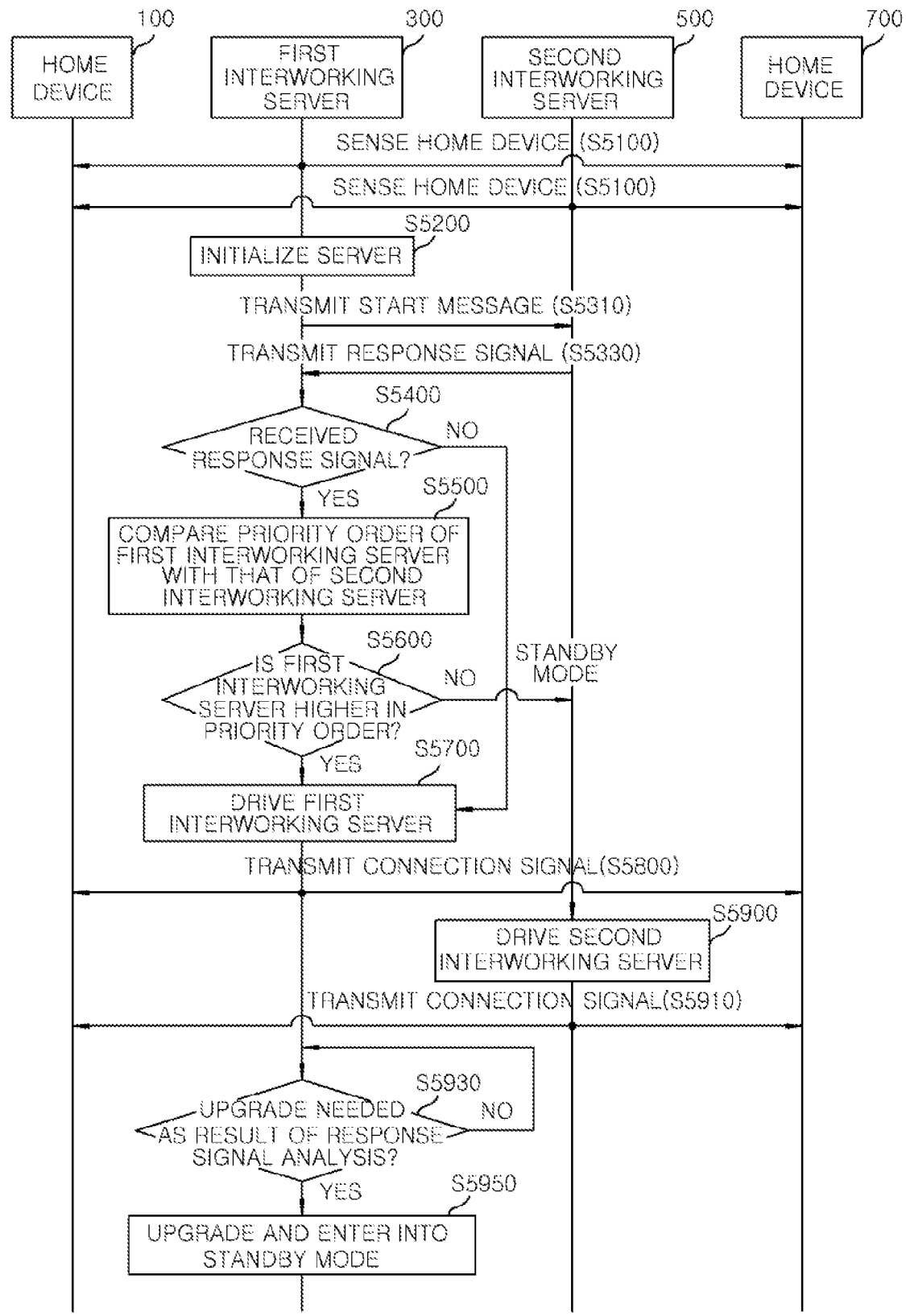
FIG. 5 is a sequential diagram illustrating a process for transceiving data among respective components included in the system for providing interworking service in a home network shown in FIG. 1 in accordance with an embodiment of the present invention.
Figure 6B:
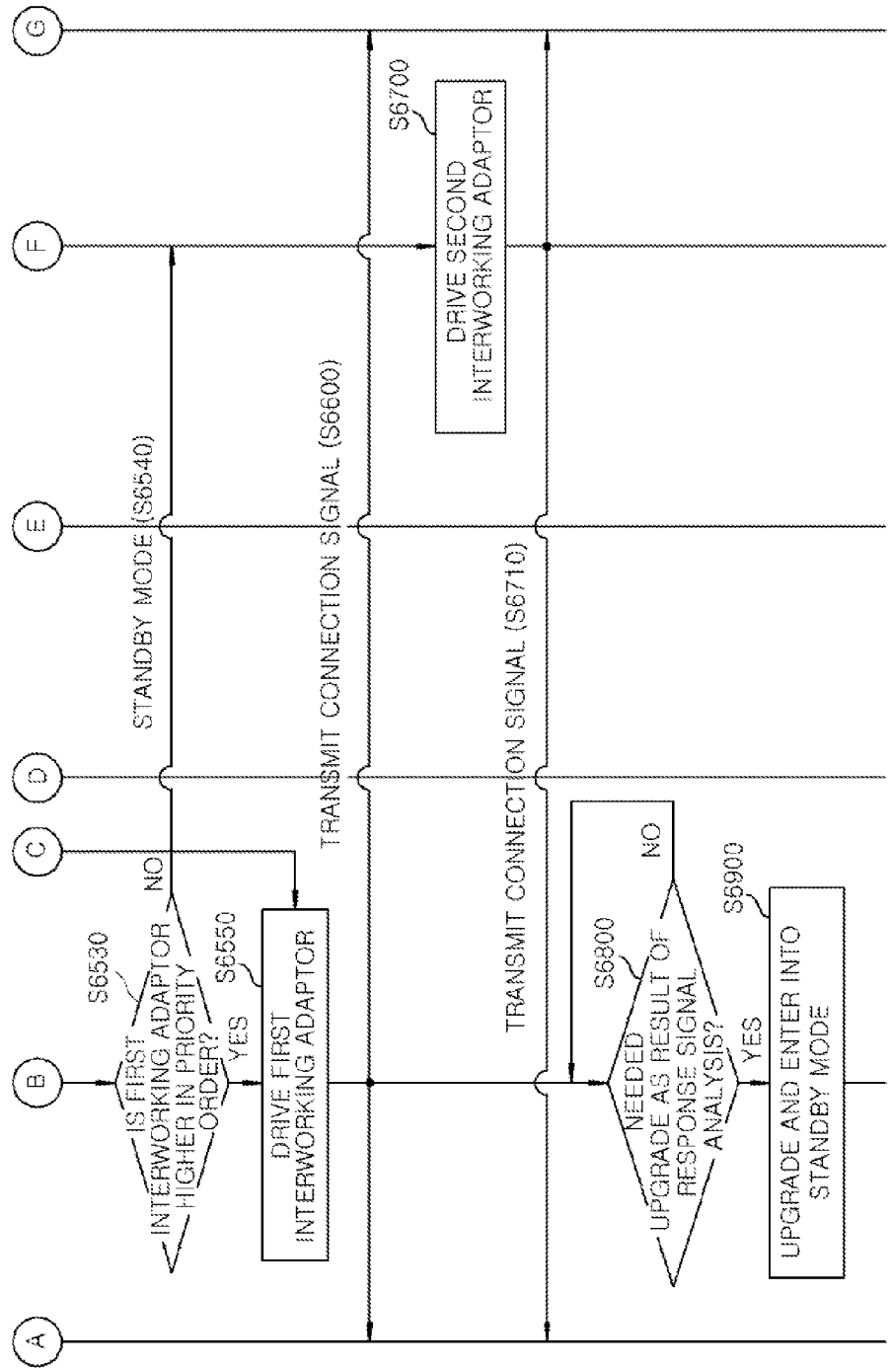

FIG. 5 is a sequential diagram illustrating a process for transceiving data among respective components included in the system for providing an interworking service in a home network shown in FIG. 1 in accordance with an embodiment of the present invention, and FIGS. 6A and 6B is a sequential diagram illustrating a process for transceiving data among respective components included in the system for providing an interworking service in a home network shown in FIG. 1 in accordance with another embodiment of the present invention. Hereinafter, while an example of a process for transceiving signals will be described with reference to FIGS. 5 and 6 in accordance with an embodiment of the present invention, the embodiment of the present invention is not limited thereto. Further, in accordance with different embodiments described above, it is obvious to those skilled in the art that a process for transceiving data shown in FIGS. 5 and 6 may be modified and changed without departing from the scope of the present invention.

Referring to FIG. 5, a first interworking server 300 and a second interworking server 500 sense home devices 100 and 700 respectively connected thereto, in operation S5100. Next, the first interworking server 300 initializes itself in operation S5200, and transmits a start message to the second interworking server 500 in operation S5310.

When the second interworking server 500 transmits a response signal in operation S5330, the first interworking server 300 determines whether it received the response signal in operation S5400. Next, when it is determined that the first interworking server 300 received the response signal, priority orders of the first and second interworking servers 300 and 500 are compared with each other in operation S5500.

Next, when it is determined that the priority order of the first interworking server 300 is higher than that of the second interworking server 500 in operation S5600, the first interworking server 300 is driven in operation S5700. However, when it is determined that the priority order of the first interworking server 300 is lower than that of the second interworking server 500 in operation S5600, the first interworking server 300 enters into a standby mode and periodically transmits a message to notify the situation of its own to the other interworking server.

When the first interworking server 300 is driven, it transmits a connection signal to the home devices 100 and 700 in operation S5800. Meanwhile, when the second interworking server 500 is driven in operation S5900, it transmits a connection signal to the home devices 100 and 700 in operation S5910.

When the first interworking server 300 analyzes the response signal and then determines that an upgrade is needed in operation S5930, it upgrades itself, and start again or enter into a standby mode in operation S5950.

Referring to FIGS. 6A and 6B, the first and second interworking adaptors 200 and 600 transmit an operation identification signal to the first and second interworking servers 300 and 500, respectively in operation S6100. When the first and second interworking adaptors 200 and 600 receive response messages from the first and second interworking servers 300 and 500, respectively, in operation S6200, they sense the home devices 100 and 700 in operation S6300.

The first interworking adaptor 200 initializes itself, transmits a start message to the second interworking adaptor 600 in operation S6410 and receives a response signal from the second interworking adaptor 600 in operation S6430.

The first interworking adaptor 200 determines whether it received the response signal in operation S650 and compares a priority order of the first interworking adaptor 200 with that of the second interworking adaptor 600 in operation S6510.

When the priority order of the first interworking adaptor 200 is higher than that of the second interworking adaptor 600 in operation S6530, the first interworking adaptor 200 is driven. However, when the priority order of the first interworking adaptor 200 is lower than that of the second interworking adaptor 600, the first interworking adaptor 200 enters into a standby mode and may periodically transmit data based its situation to the other interworking adaptor in operation S6540.

The first interworking adaptor 200 transmits a connection signal to both the home devices 100 and 700. After that, when the second interworking adaptor 600 is driven in operation S6700, the second interworking adaptor 600 transmits a connection signal to both the home devices 100 and 700 in operation S6710).

When the first interworking adaptor 200 determines that it needs to be upgraded as a result of analyzing the response signal in operation S6800, it upgrades and then enters into a standby mode or started again in operation S6900.

What was not described in the method for providing interworking service in a home network of FIGS. 5 and 6 are identical to or may be inferred from what was described in the method for providing interworking service in a home network of FIGS. 1 to 4 above. Therefore, a further description of the method for providing interworking service in a home network will be omitted.

The order among the operations S5100 to S5930 and S6100 to S6900 described above is merely an example, to which the present invention is not limited. That is, the order among the operations S5100 to S5930 and S6100 to S6900 described above may be modified, and some operations may be simultaneously executed or deleted.

Figure 7:
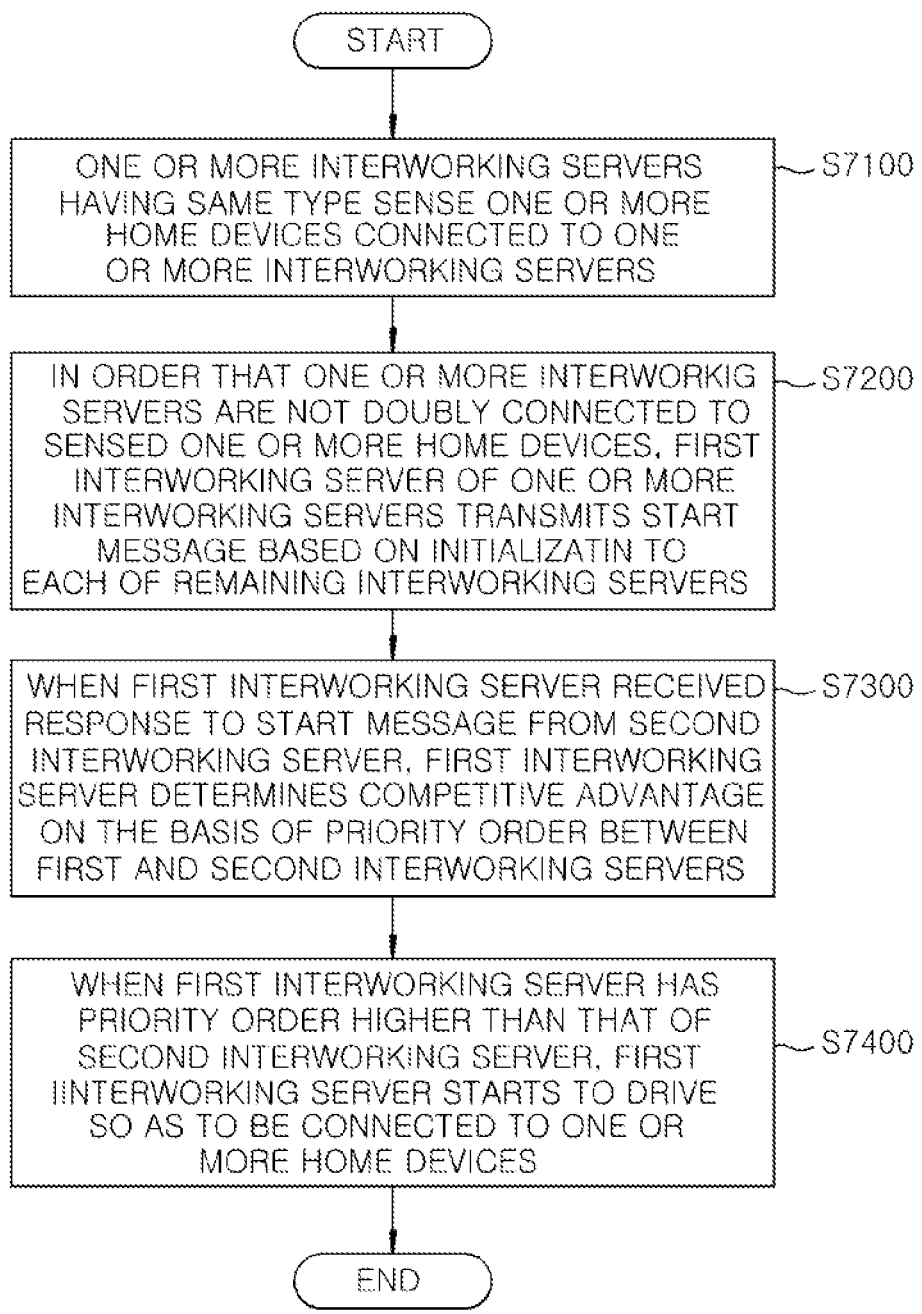
FIG. 7 is a flowchart illustrating a method for providing interworking service in a home network in accordance with an embodiment of the present invention.
Figure 8:
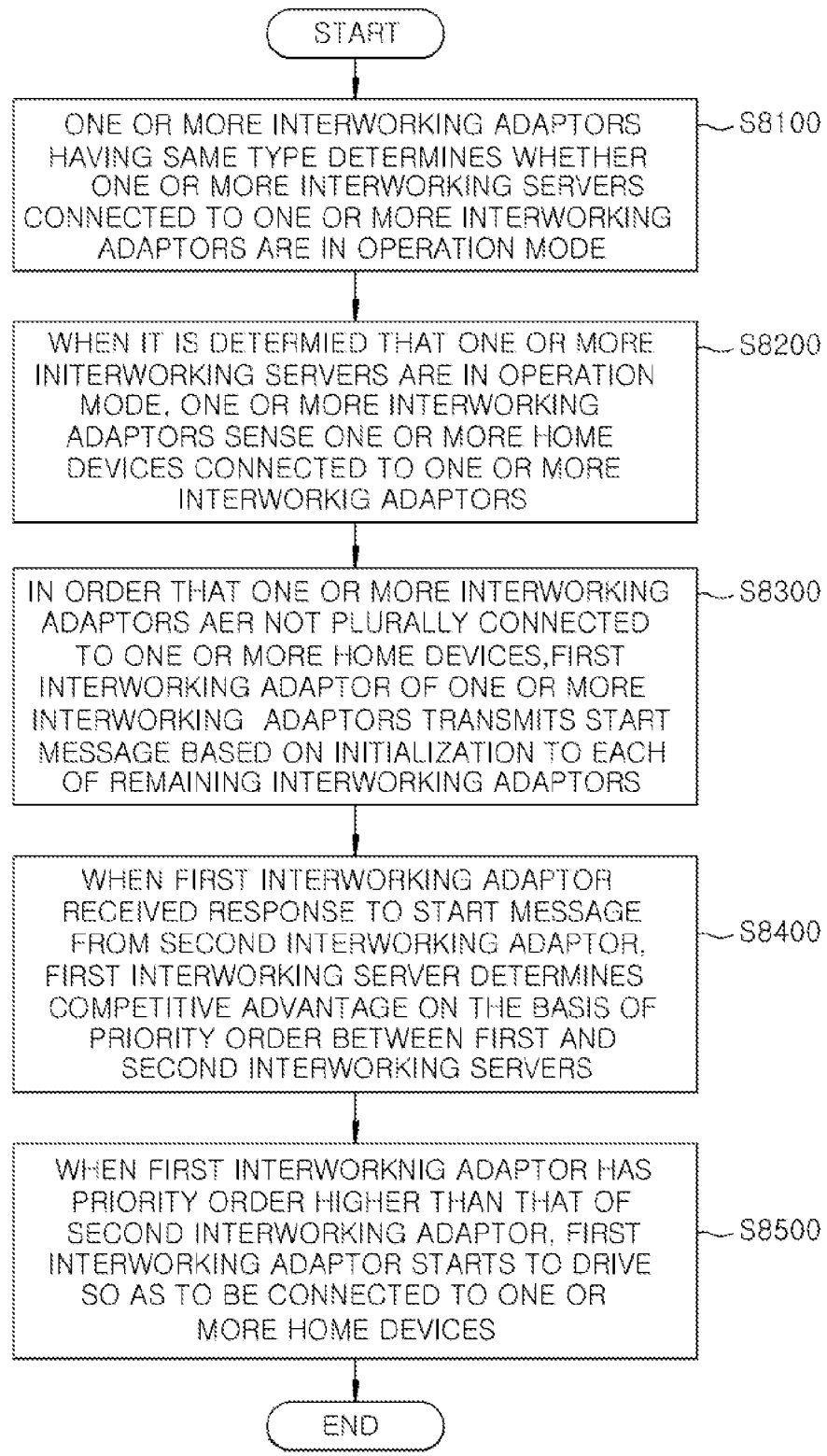
FIG. 8 is a flowchart illustrating a method for providing interworking service in a home network in accordance with another embodiment of the present invention.

FIG. 7 is a flowchart illustrating a method for providing interworking service in a home network in accordance with an embodiment of the present invention, and FIG. 8 is a flowchart illustrating a method for providing interworking service in a home network in accordance with another embodiment of the present invention.

Referring to FIG. 7, one or more interworking servers having a same type sense one or more home devices connected to the one or more interworking servers, respectively, in operation S7100.

In order that the one or more interworking servers are not doubly connected to the sensed one or more home devices, a first interworking server among the one or more interworking servers transmits a start message based on an initialization to each of the remaining interworking servers in operation S7200.

When the first interworking server receives a response to the start message from the second interworking server, the first interworking server determines a competitive advantage on the basis of a priority order between the first and second interworking servers in operation S7300. Subsequently, when the first interworking server has a priority order higher than that of the second interworking server, the first interworking server starts to drive so as to make a connection to the one or more home devices in operation S7400.

Referring to FIG. 8, it is determined whether the one or more interworking servers connected to the one or more interworking adaptors, which are same in type, are in an operation mode in operation S8100. When it is determined that the one or more interworking servers are in an operation mode, the one or more interworking adaptors sense the one or more home devices connected to the one or more interworking adaptors, respectively in operation S8200.

In order that the one or more interworking adaptors are not doubly connected to the one or more home devices, a first interworking adaptor of the one or more interworking adaptors then transmit a start message based on an initialization to each of the remaining interworking adaptors in operation S8300.

Next, when the first interworking adaptor receives a response to the start message from a second interworking adaptor, the first interworking server determines a competitive advantage on the basis of a priority order between the first and second interworking servers in operation S8400. Further, when the first interworking adaptor has a priority order higher than that of the second interworking adaptor, the first interworking adaptor starts to drive so as to be connected to the one or more home devices in operation S8500.

What was not described in the method for providing interworking service in a home network of FIGS. 7 and 8 is identical to or may be inferred from that of the method for providing interworking service in a home network of FIGS. 1 to 6 and, therefore, a further description of the method for providing interworking service in a home network will be omitted.

While the present invention has been shown and described with respect to the exemplary embodiments, the present invention is not limited thereto. For example, respective components described to be one body may be implemented separately from one another, and likewise components described separate from one another may be implemented in an integrated type.

It will be understood by those skilled in the art that various changes and modifications may be made without departing from the scope of the invention as defined in the following claims.

What is claimed is:

1. A method for providing an interworking service in a home network, the method comprising:

sensing, in one or more interworking servers that have a same type, one or more home devices that are connected to the one or more interworking servers, respectively;

transmitting, in a first interworking server of the one or more interworking servers, a start message based on an initialization to the remaining interworking servers to allow the one or more interworking servers to identify each other, so that the one or more interworking servers are not doubly connected to the sensed one or more home devices;

if the first interworking server receives a response to the start message from a second interworking server of the remaining interworking servers, determining, in the first interworking server, a competitive advantage on the basis of a priority order between the first and second interworking servers;

if the first interworking server has a priority order higher than that of the second interworking server, starting, in the first interworking server, to drive so as to make a connection to the one or more home devices; and if the first interworking server has a priority order lower than that of the second interworking server, in the first interworking server, terminating, its operation and entering into a standby mode until time to receive the start message based on the initialization from the remaining interworking servers, wherein, if the first interworking server receives the response to the start message from the second interworking server, the method further comprises:
in the first interworking server, analyzing data included in the response and identifying whether the second interworking server has a program whose version is higher than that of the first interworking server; and
if it is identified that the second interworking server has the program whose version is higher than that of the first interworking server, in the first interworking server, starting a program upgrade so as to have a program whose version is the same as that of the second interworking server.

2. The method of claim 1, wherein, if the first interworking server does not receive the response to the start message from the remaining interworking servers, the first interworking server starts to drive so as to make a connection to the one or more home devices.

3. The method of claim 1, wherein the one or more interworking servers are connected to one or more interworking adaptors;
the one or more interworking adaptors allow the one or more interworking servers to make a connection to the one or more home devices; and
the one or more interworking adaptors are included for each middleware built in the one or more home devices.

4. The method of claim 1, wherein the priority order is settled depending on at least one of a user setting, an IP address, and a MAC address.

5. A method for providing an interworking service in a home network, the method comprising:
determining whether one or more interworking servers connected to one or more interworking adaptors are in an operation mode, the interworking adaptors having a same type;
if it is determined that the one or more interworking servers are in the operation mode, in the one or more interworking adaptors, sensing the one or more home devices connected to the one or more interworking adaptors, respectively;
transmitting, in a first interworking adaptor of the one or more interworking adaptors, a start message based on an initialization to the remaining interworking adaptors to allow the one or more interworking adaptors to identify each other, so that the one or more interworking adaptors are not doubly connected to the sensed one or more home devices;
if the first interworking adaptor receives a response to the start message from a second interworking adaptor of the remaining interworking adaptors, in the first interworking adaptor, determining a competitive advantage on the basis of a priority order between the first and second interworking adaptors;
if the first interworking adaptor has a priority order higher than that of the second interworking adaptor, in the first interworking adaptor, starting to drive so as to make a connection to the one or more home devices; and
if the first interworking adaptor has a priority order lower than that of the second interworking adaptor, in the first interworking adapter, terminating its operation and entering into a standby mode until time to receive the start message based on the initialization from the remaining interworkinq adaptors,
wherein, if the first interworkinq adaptor receives the response to the start message from the second interworkinq adaptor, the method further comprises:
in the first interworking adaptor, analyzing data included in the response and identifies whether the second interworking adaptor has a program whose version is higher than that of the first interworking adaptor; and
if it is identified that the second interworking adaptor has a program whose version is higher than that of the first interworking adaptor, in the first interworking adaptor, starting a program upgrade so as to have a program whose version is the same as that of the second interworking adaptor.

6. The method of claim 5, wherein, if the first interworking adaptor does not receive the response to the start message from the remaining interworking adaptors, the first interworking adaptor starts to drive so as to be connected to the one or more home devices.

7. The method of claim 5, wherein the priority order is settled depending on at least one of a user setting, an IP address, and a MAC address.

* * * * *